United States Patent [19]
Kai

[11] Patent Number: 4,882,471
[45] Date of Patent: Nov. 21, 1989

[54] ELECTRONIC EQUIPMENT USING A COVER

[75] Inventor: Tomoko Kai, Urawa, Japan

[73] Assignee: Canon Kabushiki Kaisha, Tokyo, Japan

[21] Appl. No.: 82,133

[22] Filed: Aug. 6, 1987

[30] Foreign Application Priority Data

Aug. 18, 1986 [JP] Japan .................. 61-125748[U]

[51] Int. Cl.$^4$ ............................................. G06C 5/02
[52] U.S. Cl. .............................. 235/1 D; 235/145 R; 200/5 A; 361/380
[58] Field of Search .................... 235/1 D, 145 R; 200/5 A, 392; 206/305, 328; 220/339; 361/398, 380; 364/705, 708, 900

[56] References Cited

U.S. PATENT DOCUMENTS 4,259,568  3/1981  Dynesen .......................... 235/1 D
4,703,160  10/1987  Narishima et al. ............... 235/1 D Primary Examiner—B. R Fuller
Attorney, Agent, or Firm—Fitzpatrick, Cella, Harper & Scinto

[57] ABSTRACT

Electronic equipment includes a keyboard portion arranged on an electronic equipment body, for inputting data, a solar cell, arranged on the electronic equipment body, for supplying power, a cover for protecting the solar cell, and a display portion arranged on the cover.

13 Claims, 3 Drawing Sheets

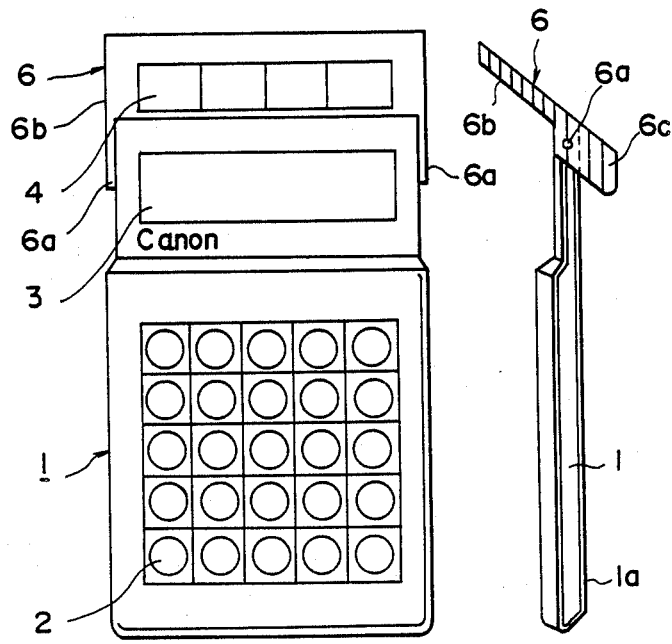

ELECTRONIC EQUIPMENT USING A COVER

BACKGROUND OF THE INVENTION

1. Field of the Invention

The present invention relates to an electronic equipment with a cover wherein the cover is attached to the electronic equipment, and when the cover is closed, a display and a solar cell face each other.

2. Related Background Art

An electronic calculator is known as an example of a conventional electronic equipment with a cover. A cover attached to an electronic calculator of this type merely covers an operation panel of an equipment body 1 when the equipment is not operated, as indicated by a broken line 5 in FIG. 3A. FIG. 3A is a side view of the electronic calculator. A keyboard portion 2, a display portion 3 such as a liquid crystal display, and a power source portion 4 such as a solar cell are arranged on the upper surface side of the drawing.

Generally, the keyboard portion 2 requires a predetermined stroke upon depression of the keys, and the equipment requires a large thickness D so as to incorporate electronic parts such as an LSI (large-Scale Integrated circuit). On the other hand, the display portion 3 such as the liquid crystal display and the power source portion 4 such as the solar cell can be thinner compared with the keyboard portion 2. Therefore, a thickness d of these portions can be substantially half or less the thickness D (i.e., $D \geq 2d$).

However, the operation of the equipment is performed on the upper surface side of FIG. 3A. Therefore, if the keyboard portion 2, the display portion 3, and the power source portion 4 are arranged on the upper surface of the equipment body 1, an idle space 1a is formed below the power source portion 4, and a length L of equipment body 1 is increased, resulting in large equipment. More specifically, the arrangement shown in FIG. 3A can provide good operability but has a poor space factor, resulting in large equipment. FIG. 3B is a side view of electronic equipment free from the above problem. The power source portion 4 is arranged below (rear surface side) of the display portion 3 to eliminate the idle space 1a shown in FIG. 3A, and a length l ($<L$) is decreased to render the equipment compact. If the power source portion 4 comprises a thin chemical cell, the arrangement of FIG. 3B poses no problem. However, if the power source portion 4 employs a solar cell, since light is radiated downward from the upper side of the drawing, the solar cell cannot be used if it is arranged below the display portion 3. More specifically, the arrangement shown in FIG. 3B can have a high space factor and can render the equipment compact. However, this arrangement cannot allow use of the solar cell, thus preventing an energy-saving design.

SUMMARY OF THE INVENTION

It is an object of the present invention to provide an electronic equipment with a cover free from the conventional problems, wherein electronic parts are attached not only to an equipment body side but to a cover side to render the equipment compact, and an energy-saving design using a solar cell is allowed.

It is another object of the present invention to provide an electronic equipment wherein when a cover pivotally arranged near an end portion of an equipment body is closed, a display portion and a power source portion (solar cell) face each other, and when the cover is opened, the display portion and the power source portion are exposed to be rendered operative, so that the equipment body can be rendered compact in the closed state of the cover.

It is still another object of the present invention to provide an electronic equipment comprising:
  input means, arranged on an electronic equipment body, for inputting data;
  a solar cell, arranged on the electronic equipment body, for supplying power;
  a cover for protecting the solar cell; and
  display means arranged on the cover.

It is still another object of the present invention to provide an electronic equipment having:
  input means, arranged on an electronic equipment body, for inputting data;
  display means, arranged on the electronic equipment body, for displaying the data;
  a cover for protecting the display means; and
  a solar cell, arranged on the cover, for supplying power to the electronic equipment.

BRIEF DESCRIPTION OF THE DRAWINGS

FIGS. 1A and 1B and FIGS. 2A and 2B show an embodiment of the present invention, in which FIGS. 1A and 1B are respectively a front view and a side view showing a state wherein a cover is closed and FIGS. 2A and 2B are respectively a front view and a side view showing a state wherein the cover is open;

DESCRIPTION OF THE PREFERRED EMBODIMENT

Figure 1A:
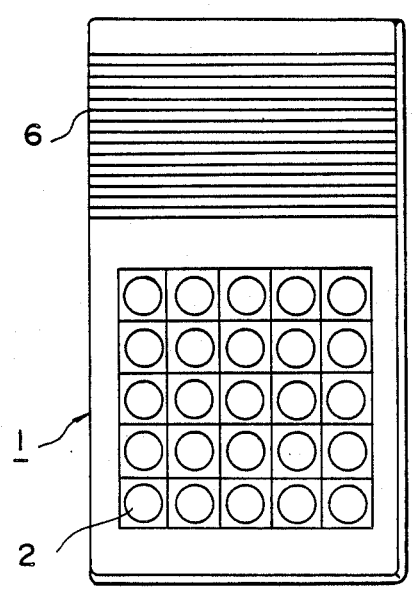
Figure 1B:
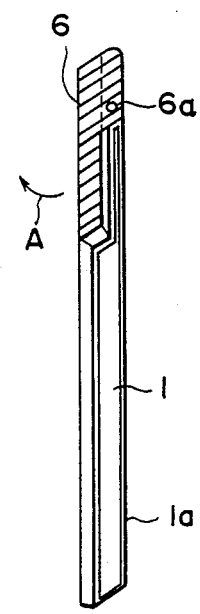
Figure 3A:
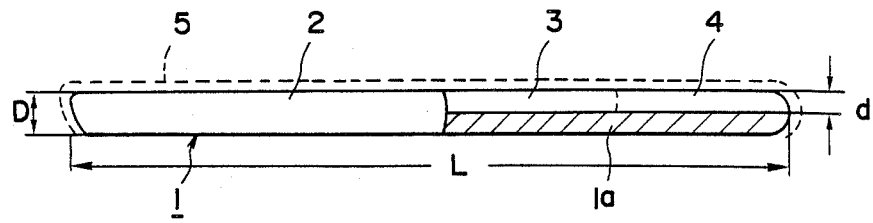
FIG. 3A is a side view showing a first prior art of an arrangement wherein a power source portion is arranged on the operation panel side.
Figure 3B:
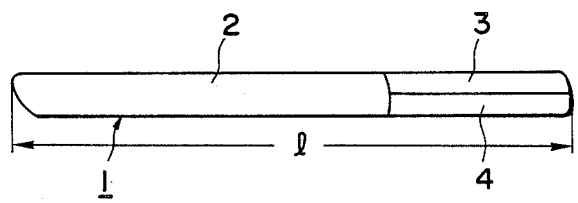
FIG. 3B is a side view showing a second prior art of an arrangement wherein a power source portion is arranged below a display portion.

FIGS. 1A and 1B and FIGS. 2A and 2B show an embodiment of the present invention. FIGS. 1A and 1B are respectively a front view and a side view showing a closed state of a cover. FIGS. 2A and 2B are respectively a front view and a side view showing an open state of the cover.

The arrangement shown in FIGS. 1A and 1B, and FIGS. 2A and 2B includes a calculator body 1 having a bottom surface 1a, a keyboard portion 2, a display portion 3 such as a liquid crystal display, and a power source portion 4 such as a solar cell. The power source portion 4 is connected to the body 1 through a flexible wire (not shown). A cover 6 having a cover inner surface 6b is pivotally mounted on the body 1 through a hinge 6a. When the cover 6 is opened, a stand portion 6c projects l downward.

When the cover 6 is closed as shown in FIGS. 1A and 1B, the display portion arranged on the operation panel side of the body 1 faces the power source portion arranged on the inner surface of the cover 6. For this reason, the display portion and the power source portion can be prevented from damage. As described above, since the display portion and the power source portion have the small thickness, the top and bottom surfaces of the body 1 can be flat in the closed state of the cover, as shown in FIG. 1B.

When the cover 6 is pivoted in a direction indicated by arrow A about the hinge 6a, the open state shown in FIGS. 2A and 2B is obtained. In the open state of the cover 6 shown in FIGS. 2A and 2B, the display portion 3 and the power source portion 4 are exposed to the operation panel side, and can be rendered operative.

The positions of the display portion 3 and the power source portion 4 are not limited to those shown in the drawings but can be replaced with each other. More specifically, the display portion can be arranged on the cover side, and the power source portion can be arranged on the electronic equipment body side.

Note that as shown in FIG. 2B, if the stand portion 6c is arranged to project to the right in the drawing from the bottom surface 1a of the body 1, the body 1 can be inclined when it is used on the desk. Thus, an operator can easily see the display portion 3.

According to the present invention as described above, when the cover is closed, the display portion and the power source portion are housed inside the cover to be prevented from damage. When the cover is opened, the display portion and the power source portion are exposed to the operation panel side, so that an energy-saving design using a solar cell as the power source can be allowed. In addition, the equipment can be rendered compact.

I claim:

1. Electronic equipment comprising:
   input means arranged on an electronic equipment body for inputting data;
   display means arranged on said electronic equipment body for displaying the data;
   cover means pivotally arranged on said electronic equipment body for protecting said display means; and
   a solar cell arranged on said cover means.

2. Electronic equipment according to claim 1, wherein said cover means is arranged so as to project from an outside of said electronic equipment body.

3. Electronic equipment according to claim 1, wherein said display means comprises a liquid crystal display element.

4. Electronic equipment according to claim 1, wherein a thickness of a portion of said electronic equipment body having said input means arranged thereon is different from that of a portion of said electronic equipment body having said display means arranged thereon.

5. Electronic equipment according to claim 4, wherein the thickness of the portion of said electronic equipment body having said input means arranged thereon is larger than that of the portion of said electronic equipment body having said display means arranged thereon.

6. Electronic equipment according to claim 1, wherein a thickness of a portion of said electronic equipment body having said input means arranged thereon is equal to a sum of a thickness of a portion of said electronic equipment body having said display means arranged thereon and a thickness of a portion of said electronic equipment body having said cover means arranged thereon.

7. Electronic equipment according to claim 1, wherein when said cover means is rotated about a shaft of said cover means, one end portion of said cover means is adapted to be used as a member for causing said electronic equipment to be inclined.

8. Electronic equipment comprising:
   a keyboard arranged on a housing of the electronic equipment and having a plurality of keys for inputting data;
   a liquid crystal display arranged on the housing of said electronic equipment in parallel with said keyboard for displaying the data;
   cover means pivotally arranged at one end of the housing of said electronic equipment for protecting said liquid crystal display; and
   a solar cell arranged on said cover means to face said liquid crystal display.

9. Electronic equipment according to claim 8, wherein said cover means is arranged so as to project from an outside of said electronic equipment body.

10. Electronic equipment according to claim 8, wherein a thickness of a portion of said housing having said keyboard arranged thereon is different from that of a portion said housing having said liquid crystal display arranged thereon.

11. Electronic equipment according to claim 10, wherein the thickness of the portion of said housing having said keyboard thereon is larger than that of the portion of said housing having said liquid crystal display arranged thereon.

12. Electronic equipment according to claim 8, wherein a thickness of a portion of said housing having said keyboard arranged thereon is equal to a sum of a thickness of said housing having said liquid crystal display arranged thereon and a thickness of a portion of said housing having said cover means arranged thereon.

13. Electronic equipment according to claim 8, wherein when said cover means is rotated about a shaft of said cover means, one end portion of said cover means is adapted to be used as a member for causing said electronic equipment to be inclined.

* * * * *

UNITED STATES PATENT AND TRADEMARK OFFICE
CERTIFICATE OF CORRECTION

PATENT NO.　: 4,882,471
DATED　　　: November 21, 1989
INVENTOR(S) : Tomoko Kai

It is certified that error appears in the above-identified patent and that said Letters Patent is hereby corrected as shown below:

COLUMN 1:

Line 24, "(large-Scale" should read --(Large-Scale--.

COLUMN 2:

Line 56, "1" should be deleted.

COLUMN 4:

Line 34, "portion" should read --portion of--.

Signed and Sealed this

Ninth Day of June, 1992

Attest:

DOUGLAS B. COMER

Attesting Officer　　Acting Commissioner of Patents and Trademarks